United States Patent [19]

Reichelt et al.

[11] Patent Number: 5,266,227
[45] Date of Patent: Nov. 30, 1993

[54] OIL-SOLUBLE PHENYLAZOANILINE DYES

[75] Inventors: Helmut Reichelt, Neustadt; Christos Vamvakaris, Kallstadt; Georg Zeidler, Dannstadt-Schauernheim, all of Fed. Rep. of Germany

[73] Assignee: BASF Aktiengesellschaft, Ludwigshafen, Fed. Rep. of Germany

[21] Appl. No.: 831,351

[22] Filed: Feb. 5, 1992

[30] Foreign Application Priority Data

Feb. 22, 1991 [DE] Fed. Rep. of Germany ....... 4105603

[51] Int. Cl.$^5$ ..................... C10L 1/22; C09B 29/085
[52] U.S. Cl. .................... 252/51.5 R; 44/328; 534/851; 534/857; 534/858; 208/12; 208/15; 208/16
[58] Field of Search ............. 534/851, 857, 858, 851; 208/12, 15, 16; 8/521; 44/328; 252/51.5 R

[56] References Cited

U.S. PATENT DOCUMENTS

| | | | |
|---|---|---|---|
| 2,108,824 | 9/1936 | McNally et al. | 534/851 X |
| 2,135,008 | 11/1938 | Kleiner et al. | 534/851 |
| 2,387,987 | 10/1945 | Felix et al. | 534/851 X |
| 2,632,004 | 3/1953 | Minsk et al. | 534/851 X |
| 2,888,450 | 5/1959 | Kruckenberg | 534/857 X |
| 3,962,209 | 6/1976 | Gotteschlich et al. | 534/851 X |
| 3,993,619 | 11/1976 | Kruckenberg et al. | 534/851 X |
| 4,904,765 | 2/1990 | Derber et al. | 534/573 |
| 5,145,573 | 9/1992 | Riedel et al. | 208/16 X |

FOREIGN PATENT DOCUMENTS

| | | |
|---|---|---|
| 1050709 | 3/1979 | Canada . |
| 0256460 | 2/1988 | European Pat. Off. . |
| 0419976 | 4/1991 | European Pat. Off. . |
| 2232636 | 1/1975 | France . |
| 1071473 | 6/1967 | United Kingdom ............. 534/851 |
| 1119326 | 7/1968 | United Kingdom ............. 534/858 |

OTHER PUBLICATIONS

Chemical Abstracts, 215880h, vol. 111, No. 24, Dec. 11, 1989, & Textile Research Journal, vol. 59, No. 6, Jun. 1989, pp. 343-349, H. S. Freeman et al.,: "Photolytic Properties of Ortho-Substituted 4-[N,N-Bis(β-Hydroxyethyl)Amino]Azobenzenes in Polymer Substrates".
Chemical Abstracts, 211527y, vol. 100, No. 26, Jun. 1984, & Journal of the Chemical Society of Japan, No. 3, 1984, pp. 452-457, T. Misono, et al.,: "Study on Dyeing of Polyester Fiber with Disperse Azo Dyes IV. Absorption Spectroscopic Studies on Interaction between Disperse Azo Dyes and Polyester Model, an Estimation of the Interactions from Modified McRae's Equation," (with English abstract).
Chemical Abstracts, 134254f, vol. 95, No. 16, Oct. 1981, & Journal of the Chemical Society of Japan, No. 8, Aug. 1981, pp. 1299-1305, T. Misono, et al.,: "Studies on Dyeing of Polyester Fiber with Disperse Azo Dyes-.II. Studies on the Interaction between Disperse Azo Dyes and Poly(Ethylene Terephthalate)Fiber in Tetrachloromethylene" (with English abstract).
Colour Index, Third Ed., vol. 4, C.I. 13058 (1971).
Farbenfabriken, *Chemical Abstracts*, vol. 51, No. 9166e (1957).

*Primary Examiner*—Mary C. Lee
*Assistant Examiner*—Fiona T. Powers
*Attorney, Agent, or Firm*—Oblon, Spivak, McClelland, Maier & Neustadt

[57] ABSTRACT

Azo dyes useful for marking mineral oils have the formula

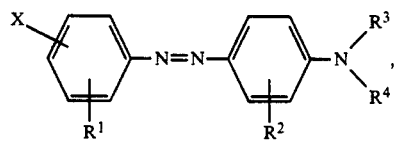

where
$R^1$ and $R^2$ are hydrogen, $C_1$-$C_4$-alkyl or $C_1$-$C_4$-alkoxy,
$R^3$ is hydrogen or $C_1$-$C_8$-alkyl which may be substituted by hydroxyl and interrupted by from 1 to 3 oxygen atoms,
$R^4$ is $C_1$-$C_8$-alkyl which may be substituted by hydroxyl and interrupted by from 1 to 3 oxygen atoms, and
X is cyano or substituted or unsubstituted $C_1$-$C_8$-alkoxycarbonyl, with the proviso that the molecule contains at least one hydroxyalkyl radical.

2 Claims, No Drawings

OIL-SOLUBLE PHENYLAZOANILINE DYES

The present invention relates to novel azo dyes of the formula I

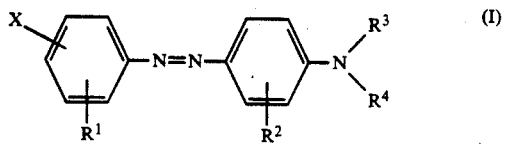

where $R^1$ and $R^2$ are identical or different and each is independently of the other hydrogen, $C_1$-$C_4$-alkyl or $C_1$-$C_4$-alkoxy, $R^3$ is hydrogen or $C_1$-$C_8$-alkyl which may be substituted by hydroxyl and interrupted by from 1 to 3 oxygen atoms in ether function, $R^4$ is $C_1$-$C_8$-alkyl which may be substituted by hydroxyl and interrupted by from 1 to 3 oxygen atoms in ether function, and X is cyano or a radical of the formula CO—OL, where L is hydrogen or $C_1$-$C_8$-alkyl which may be substituted by hydroxyl and interrupted by from 1 to 3 oxygen atoms in ether function, with the proviso that at least one of $R^3$, $R^4$ and L is substituted by hydroxyl, mineral oils containing the novel dyes, and the use of the novel dyes for marking mineral oils.

Earlier Patent Application EP-A-419976 describes azo dyes whose diazo and coupling components belong to the aniline series. However, these dyes have no cyano or carboxylate group.

It is an object of the present invention to provide novel azo dyes whose diazo and coupling components both belong to the aniline series and where the radical of the diazo component shall be derived from an aminobenzoic acid derivative. These dyes shall be advantageously suitable for marking mineral oils.

We have found that this object is achieved by the azo dyes of the formula I defined at the beginning.

Any alkyl appearing in the abovementioned formula I may be either straight-chain or branched.

$R^1$, $R^2$, $R^3$, $R^4$ and L are each for example methyl, ethyl, propyl, isopropyl, butyl, isobutyl, sec-butyl or tert-butyl.

$R^1$ and $R^2$ may each also be for example methoxy, ethoxy, propoxy, isopropoxy, butoxy, isobutoxy or sec-butoxy.

$R^3$, $R^4$ and L may each also be for example pentyl, isopentyl, neopentyl, tert-pentyl, hexyl, heptyl, octyl, 2-ethylhexyl, 2-hydroxyethyl, 2- or 3-hydroxypropyl, 3-hydroxyprop-2-yl, 2-hydroxybutyl, 4-hydroxybutyl, 1-hydroxybut-2-yl, 3-hydroxybut-2-yl, 3-hydroxybutyl, 5-hydroxy-3-oxapentyl, 2,5-diethyl-5-hydroxy-3-oxapentyl or 8-hydroxy-3,6-dioxaoctyl.

If alkyl interrupted by oxygen atoms appears in the formula I, preference is given to those alkyl radicals which are interrupted by one or two oxygen atoms, in particular one oxygen atom.

Preference is given to those azo dyes of the formula I where X is ortho to the azo linkage.

Particular preference is given to azo dyes of formula I where X is the radical CO—OL, where L is as defined above.

Particular preference is further given to azo dyes of formula I where $R^1$ is hydrogen,
$R^2$ is hydrogen, methyl or methoxy,
$R^3$ is $C_1$-$C_4$-alkyl, and
$R^4$ is $C_2$-$C_4$-alkyl which is substituted by hydroxyl.

Particular preference is given to azo dyes of formula I where X is the radical CO—OL where L is $C_1$-$C_8$-alkyl, in particular $C_1$-$C_4$-alkyl, especially methyl or ethyl.

Particular preference is further given to azo dyes of formula I where $R^1$ and $R^2$ are each hydrogen.

Of very particular importance are azo dyes of the formula I where $R^3$ is ethyl and $R^4$ is 2-hydroxybutyl, 1-hydroxybut-2-yl or 3-hydroxybut-2-yl, or where $R^3$ is n-butyl and $R^4$ is 2-hydroxyethyl.

The azo dyes of the formula I according to the present invention can be obtained in a conventional manner, for example by diazotizing an aminobenzoic acid derivative of the formula II

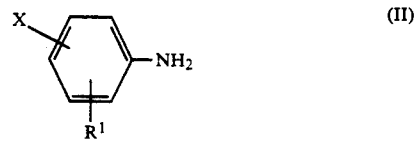

where X and $R^1$ are each as defined above, in a conventional manner and coupling the diazonium salt with an N-alkylaniline of the formula III

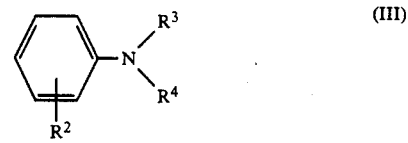

where $R^2$, $R^3$ and $R^4$ are each as defined above.

The aminobenzoic acid derivatives II and N-alkylaniline III are mostly known per se or obtainable by methods known per se.

For example, amino compounds of the formula IV

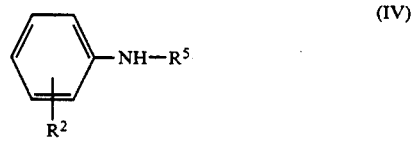

where $R^2$ is as defined above and $R^5$ is hydrogen or $C_1$-$C_8$-alkyl, can be alkoxylated with ethylene oxide, propylene oxide or 1,2- or 2,3-butylene oxide. The alkoxylation can be carried out for example in bulk or in the presence of a little water or acetic acid at in general 80°-100° C. The molar ratio of amino compound IV:alkylene oxide is in general from 1:1 to 1:2.

If a 3-hydroxypropyl or 4-hydroxybutyl radical is to be introduced, it is possible for example to react the amino compound IV with 3-chloropropanol, 3-chloropropyl acetate, 4-chlorobutanol or 4-chlorobutyl acetate. If the esters are used, they are hydrolyzed after reaction to the amino compound IV.

The novel azo dyes of the formula I are very readily soluble in organic solvents, in particular in aromatic or aliphatic hydrocarbons.

They can be advantageously used for marking mineral oils. Accordingly, mineral oils which contain one or more azo dyes of the formula I form a further part of the subject-matter of the present invention.

Mineral oils for the purposes of the present invention are for example power fuels as gasoline, kerosine or diesel, or oils, such as heating oil or motor oil.

The dyes of the present invention are suitable in particular for marking mineral oils which have to be marked for tax reasons. To keep the costs of marking to a minimum, it would be desirable to use dyes of very high color strength. But even these strong dyes are no longer perceivable purely visually when present in high dilution in mineral oils.

The reason why the novel azo dyes are particularly suitable for use as a marking substance is that they produce an intensive color with aqueous or aqueous-alcoholic acids, i.e. because they have a high color strength. This is surprising, since it is known from EP-A-256 460 that suitable marker compounds have an acetalized hydroxyalkyl group in the coupling component.

As mineral oil markers the dyes of the present invention are generally used in the form of solutions. Suitable solvents are preferably aromatic hydrocarbons such as toluene or xylene. To avoid making the resulting solution too viscous, the dye concentration is in general set at from 30 to 50% by weight, based on the solution.

Using the dyes of the present invention it is a very simple matter to detect marked mineral oils, even if the marking substances are present only in a concentration of approximately 0.1 ppm. Of particular importance here is the simplicity of the test for detecting the dyes of the present invention. It is generally sufficient to extract about 100 ml of the mineral oil with 10 ml of the aqueous acid in order to obtain the color reaction.

Suitable acids for carrying out the color reaction test are predominantly aqueous mineral acids, for example hydrochloric acid or sulfuric acid, or else aqueous-alcoholic (advantageously ethanolic) hydrochloric acid in a concentration of approximately 3-20% by weight, preferably 5-10% by weight.

The following examples will further illustrate the invention:

EXAMPLE 1

15 g of methyl anthranilate and 0.3 g of an anionic surfactant were emulsified in a mixture of 50 ml of water, 60 ml of toluene and 50 ml of 5N hydrochloric acid at room temperature and mixed with 100 g of ice followed by a concentrated aqueous solution of 6.9 g of sodium nitrite. The diazotization took 30 minutes at 0°-5° C.; then the excess nitrite was removed with amidosulfonic acid. To dissolve the diazonium salt, a solution of 17.3 g of N-ethyl-N-(2-hydroxyethyl)aniline in 125 ml of toluene was then added dropwise at 10°-15° C. with intensive stirring. The pH of the reaction mixture was then raised to about 4 with 2.5N sodium acetate solution. The coupling reaction was complete after stirring overnight at 15°-20° C. at the same pH. The organic phase was repeatedly washed with water at 60° C. until it was salt-free and the toluene was distilled off to leave about 40 g of an oily dye of the formula

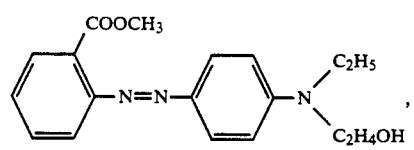

which readily gives an orange solution in aromatics ($\lambda_{max}$ (toluene):416 nm).

The dyes listed below in the table are obtained in a similar manner.

| Example No. | Dye | Hue in aromatics | $\lambda_{max}$ [nm] (toluene) |
|---|---|---|---|
| 2 | COOCH$_3$ — benzene — N=N — benzene — N(C$_2$H$_5$)((C$_2$H$_4$O)$_4$H) | orange | 417 |
| 3 | COOC$_4$H$_9$(n) — benzene — N=N — benzene — N(C$_2$H$_5$)(C$_2$H$_4$OH) | orange | 414 |
| 4 | COOCH$_3$ — benzene — N=N — benzene — N(C$_2$H$_5$)(C$_4$H$_8$OH) | orange | 417 |
| 5 | COOC$_2$H$_5$ — benzene — N=N — benzene — N(C$_2$H$_4$OH)(C$_2$H$_4$OH) | orange | 415 |

-continued

| Example No. | Dye | Hue in aromatics | $\lambda_{max}$ [nm] (toluene) |
|---|---|---|---|
| 6 | 2-(COOC$_2$H$_5$)-C$_6$H$_4$-N=N-C$_6$H$_4$-N(C$_2$H$_5$)(C$_3$H$_6$OH) | orange | 420 |
| 7 | 2-(COOCH$_3$)-C$_6$H$_4$-N=N-C$_6$H$_4$-N(CH$_3$)(C$_3$H$_6$OH) | orange | 412 |
| 8 | 2-(COOCH$_3$)-C$_6$H$_4$-N=N-C$_6$H$_3$(CH$_3$)-N(C$_2$H$_5$)(C$_2$H$_4$OH) | orange | 417 |
| 9 | 2-(COOC$_3$H$_7$(i))-C$_6$H$_4$-N=N-C$_6$H$_4$-N(C$_2$H$_5$)(C$_2$H$_4$OH) | orange | 415 |
| 10 | 2-(COOCH$_3$)-C$_6$H$_4$-N=N-C$_6$H$_4$-N(C$_4$H$_9$(n))(C$_2$H$_4$OH) | orange | 412 |
| 11 | 2-(COOC$_4$H$_9$(n))-C$_6$H$_4$-N=N-C$_6$H$_4$-N(C$_2$H$_4$OH)(C$_2$H$_4$OH) | orange | 410 |
| 12 | 2-(COOC$_4$H$_9$(i))-C$_6$H$_4$-N=N-C$_6$H$_4$-N(C$_2$H$_4$OH)(C$_2$H$_4$OH) | orange | 410 |
| 13 | 2-(CN)-C$_6$H$_4$-N=N-C$_6$H$_4$-N(C$_2$H$_5$)(C$_4$H$_8$OH) | orange | 415 |
| 14 | 2-(COOC$_2$H$_5$)-C$_6$H$_4$-N=N-C$_6$H$_3$(OCH$_3$)-N(C$_2$H$_5$)(C$_3$H$_6$OH) | orange | 413 |
| 15 | 2-(COOCH$_3$)-C$_6$H$_4$-N=N-C$_6$H$_4$-N(C$_4$H$_9$(i))(C$_2$H$_4$OH) | orange | 415 |

-continued

| Example No. | Dye | Hue in aromatics | $\lambda_{max}$ [nm] (toluene) |
|---|---|---|---|
| 16 | 2-(COOCH₃)-C₆H₄-N=N-C₆H₄-N(C₂H₅)(C₃H₆OH) | orange | 412 |
| 17 | 2-(COOC₂H₅)-C₆H₄-N=N-[3-CH₃-C₆H₃]-N(C₂H₅)(C₂H₄OH) | orange | 410 |
| 18 | 2-(COOC₃H₇(n))-C₆H₄-N=N-[3-CH₃-C₆H₃]-N(CH₃)(C₂H₄OH) | orange | 415 |
| 19 | 2-(COOC₂H₄OCH₃)-C₆H₄-N=N-C₆H₄-N(C₂H₄OH)₂ | orange | 412 |
| 20 | 3-(COOCH₃)-C₆H₄-N=N-C₆H₄-N(C₂H₅)(C₂H₄OH) | orange | 410 |
| 21 | H₃COOC-C₆H₄-N=N-[3-CH₃-C₆H₃]-N(C₂H₅)(C₂H₄OH) | orange | 412 |
| 22 | (i)H₉C₄OOC-C₆H₄-N=N-C₆H₄-N(C₂H₄OH)₂ | orange | 415 |
| 23 | H₃COOC-C₆H₄-N=N-C₆H₄-N(C₂H₅)(C₃H₆OH) | orange | 416 |

EXAMPLE 19 (USE)

Unleaded motor gasoline was marked with a 60% strength by weight solution of the dye of Example No. 1 in xylene, 15 mg of the solution being added per liter of gasoline.

100 ml of the gasoline to be examined were vigorously shaken with 10 ml of a mixture of 5 ml of hydrochloric acid (10% strength by weight) and 5 ml of ethanol on a shaking apparatus for 5 minutes. The alcoholic aqueous phase turned visibly red. After standing for a short time, during which phase separation took place, the red layer was colorimetrically compared against a solution of known concentration to obtain a quantitative determination of the dye content. Using this method even a blend of the marked gasoline with 20 times the amount of unmarked gasoline was still clearly detectable (concentration of dye:0.45 ppm).

EXAMPLE 20 (USE)

Light heating oil having a natural honey yellow color was marked with a 60% strength by weight solution of the dye of Example No. 1 in xylene, 20 ppm of the solution being added.

On extracting 100 ml of this yellow fuel oil with 5 ml of 10% strength by weight hydrochloric acid, the aqueous phase turned red.

We claim:
1. A mineral oil containing one or more azo dyes of the formula I

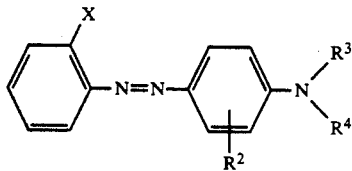

where
- $R^2$ is hydrogen, methyl or methoxy,
- $R^3$ is $C_1$–$C_4$-alkyl,
- $R^4$ is $C_2$–$C_4$-alkyl which is substituted by hydroxyl, and
- X is a radical of the formula CO—OL, where L is hydrogen or $C_1$–$C_8$-alkyl which may be substituted by hydroxyl and interrupted by from 1 to 3 oxygen atoms in ether function.

2. A process for marking a mineral oil which comprises adding to the mineral oil an azo dye of the formula I

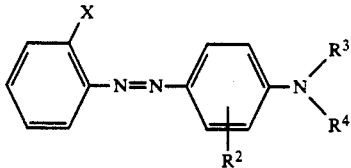

where
- $R^2$ is hydrogen, methyl or methoxy,
- $R^3$ is $C_1$–$C_4$-alkyl,
- $R^4$ is $C_2$–$C_4$-alkyl which is substituted by hydroxyl, and
- X is a radical of the formula CO—OL, where L is hydrogen or $C_1$–$C_8$-alkyl which may be substituted by hydroxyl and interrupted by from 1 to 3 oxygen atoms in ether function.

* * * * *